(12) United States Patent
Adragna et al.

(10) Patent No.: US 9,803,736 B2
(45) Date of Patent: Oct. 31, 2017

(54) DIRECT TORQUE PATH DIFFERENTIAL HAVING SPIDERLESS PINIONS

(71) Applicant: Caterpillar Inc., Peoria, IL (US)

(72) Inventors: Omar Jose Adragna, Peoria, IL (US); David Owen Thompson, Kalamazoo, MI (US)

(73) Assignee: Caterpillar Inc., Peoria, IL (US)

( * ) Notice: Subject to any disclaimer, the term of this patent is extended or adjusted under 35 U.S.C. 154(b) by 128 days.

(21) Appl. No.: 14/710,122

(22) Filed: May 12, 2015

(65) Prior Publication Data

US 2016/0333999 A1 Nov. 17, 2016

(51) Int. Cl.
*F16H 48/08* (2006.01)
*F16H 48/40* (2012.01)

(52) U.S. Cl.
CPC ............. *F16H 48/08* (2013.01); *F16H 48/40* (2013.01); *F16H 2048/085* (2013.01); *F16H 2048/087* (2013.01); *F16H 2702/06* (2013.01)

(58) Field of Classification Search
CPC ............................................. F16H 2048/087
See application file for complete search history.

(56) References Cited

U.S. PATENT DOCUMENTS

| | | | |
|---|---|---|---|
| 3,216,282 A * | 11/1965 | Randall | F16H 48/08 475/233 |
| 3,304,806 A * | 2/1967 | Adams | F16H 48/08 475/232 |
| 3,499,348 A | 3/1970 | Hartupee | |
| 4,841,807 A | 6/1989 | Merkler | |
| 5,320,587 A | 6/1994 | Bodtker et al. | |
| 5,507,702 A * | 4/1996 | Joachim | F16H 48/08 475/184 |
| 6,068,571 A | 5/2000 | Irwin | |
| 6,196,942 B1 | 3/2001 | Peterson et al. | |
| 6,692,398 B1 | 2/2004 | Sullivan | |
| 6,699,154 B2 | 3/2004 | Orr et al. | |
| 7,470,207 B2 | 12/2008 | Todd et al. | |
| 8,043,188 B2 | 10/2011 | Ziech | |
| 8,047,946 B2 | 11/2011 | Nakajima et al. | |
| 8,216,105 B2 | 7/2012 | Nakajima | |
| 8,292,775 B2 | 10/2012 | Nakajima et al. | |
| 8,628,444 B2 | 1/2014 | Cripsey et al. | |
| 2008/0051245 A1 * | 2/2008 | Nakajima | F16H 48/08 475/230 |
| 2009/0118054 A1 | 5/2009 | Nakajima | |
| 2010/0151983 A1 | 6/2010 | Ziech et al. | |
| 2011/0021305 A1 | 1/2011 | Radzevich | |
| 2014/0216883 A1 | 8/2014 | Boothby et al. | |
| 2014/0302961 A1 | 10/2014 | Downs et al. | |

FOREIGN PATENT DOCUMENTS

| | | |
|---|---|---|
| JP | 2003130179 | 5/2003 |
| JP | 2008051301 | 3/2008 |
| JP | 2008275042 | 11/2008 |

* cited by examiner

*Primary Examiner* — Erin D Bishop
*Assistant Examiner* — Lori Wu
(74) *Attorney, Agent, or Firm* — Finnegan, Henderson, Farabow, Garrett & Dunner, LLP; Jeffrey A. Greene

(57) ABSTRACT

A side pinion is disclosed for use with a differential of a mobile machine. The side pinion may have a body with a flat bottom and a flat top located at an end opposite the flat bottom. The side pinion may also have a plurality of gear teeth formed adjacent the flat top, and an arcuate outer surface connecting the plurality of gear teeth to the flat bottom.

18 Claims, 8 Drawing Sheets

FIG. 6B

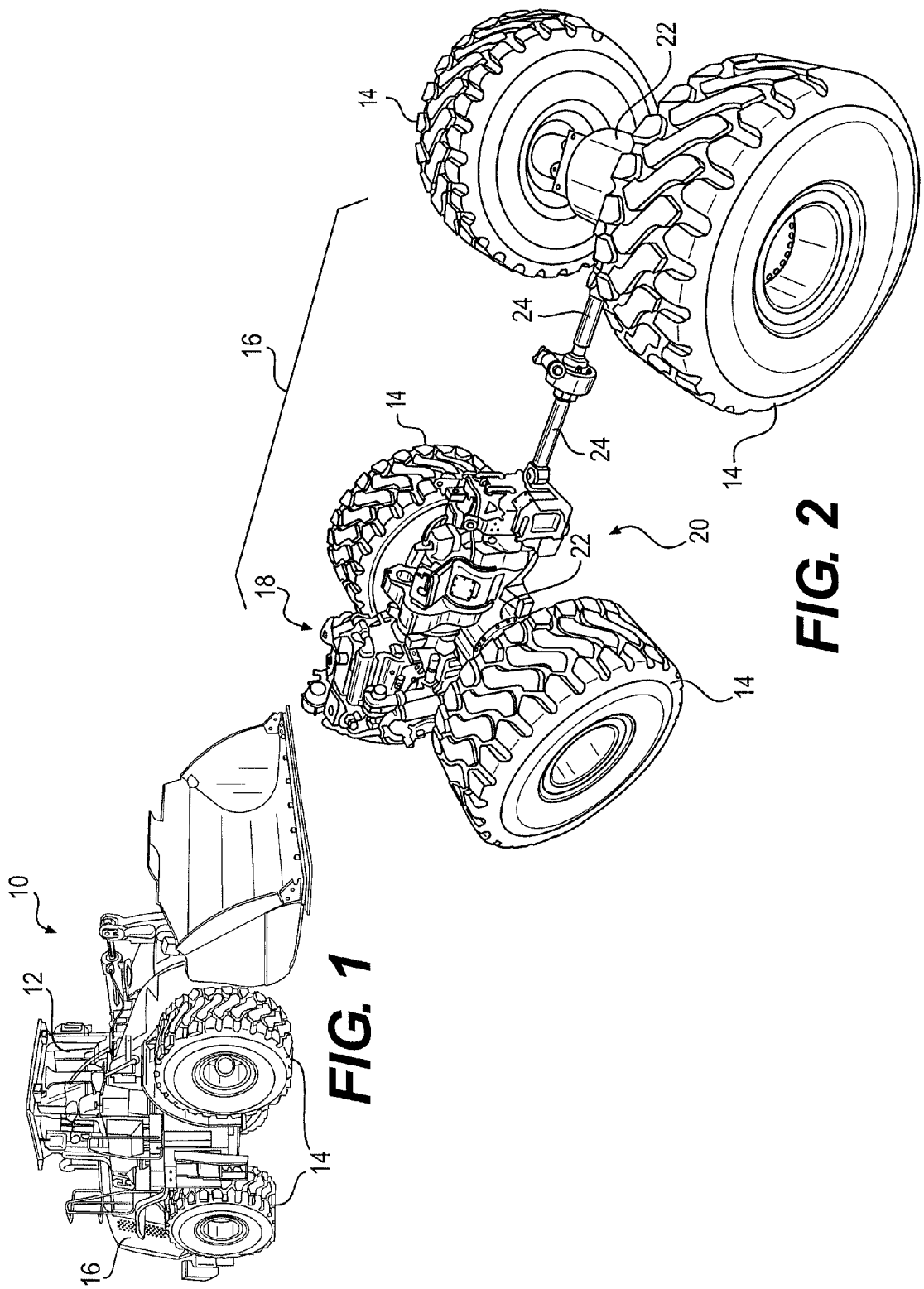

DIRECT TORQUE PATH DIFFERENTIAL HAVING SPIDERLESS PINIONS

TECHNICAL FIELD

The present disclosure relates generally to a differential and, more particularly, to a direct torque path differential having spiderless pinions.

BACKGROUND

Machines, such as wheel loaders and haul trucks, generally include a drivetrain that provides power to traction devices of the machines. The drivetrain is made up of at least three different elements, including a power source (e.g., an engine), a transmission driven by the power source, and a differential that divides power from the transmission between paired traction devices. The differential allows the paired traction devices to be driven at different speeds to accommodate turning of the machine.

A differential generally consists of a main pinion gear that is driven by the transmission to rotate a crown gear. A carrier housing is fixed to rotate with the crown gear, and includes two or more (e.g., four) different spider pinions internally located around a circumference of the carrier housing. The spider pinions are oriented radially inward and rotatably disposed on a spider shaft (e.g., a cross having four shaft ends), whose ends are connected to the carrier housing. Thus, when the carrier housing rotates about its own axis, the spider pinions also rotate about the same axis. In addition, each spider pinion spins about its own axis, which is oriented generally orthogonal to and passes through the axis of the carrier housing. A side gear is mounted at each end of the carrier housing and intermeshes with the spider pinions. The side gears are rotatable about the axis of the carrier housing, and connected to half-shafts that extend outward from the differential to respective ones of the paired traction devices. With this configuration, an input rotation provided via the main pinion gear results in separate rotations of the traction devices with substantially equal torque. During straight travel of the machine over good ground conditions, both traction devices are driven at the same speed. During turning or poor ground conditions, one traction device (e.g., the outside traction device during a turn or the slipping traction device) speeds up as the remaining traction device slows down.

While acceptable for some applications, the conventional differential can be problematic in other applications. In particular, because of the configuration of typical spider pinions, a moment is created when teeth of the spider pinions engage corresponding teeth of the side gears. This moment causes the spider pinions to tilt about the spider shaft ends. This tilting can restrict lubrication flow along the spider shaft (i.e., inside bores of the spider pinions), and even cause mechanical engagement between bore walls of the spider pinions and the spider shaft in some situations. The restricted lubrication and mechanical engagement causes premature wear of the differential.

One attempt to extend a useful life of a differential is disclosed in US Patent Publication No. 2010/0151983 (the '983 publication) of Ziech et al. that published on Jun. 17, 2010. Specifically, the '983 publication discloses a differential having a case, with a ring gear connected to an outer surface of the case and intermeshed with a pinion gear. Four recesses are formed within an inner surface of the case and directed radially inward into a hollow cavity in the case. The recesses are equally spaced around a circumference of the case. A wear cup is located within each of the recesses, and a tab of the wear cup is received within a slot in the case to prevent rotation of the wear cup. The wear cup has a flat base, and side walls that are perpendicular to the base. A side pinion is located within each of the wear cups. Each pinion has a flat heel end that fits inside the corresponding wear cup, a toe end, and a cylindrical wall that extends from the heel end to the toe end. The heel end directly contacts the flat base of the cup, and the side walls of the cup engage the cylindrical wall of the pinion to drive rotation of the pinion about an axis of the case. Side gears are also located within the case and mesh with the side pinions. The side gears are hollow and include splines that mesh with corresponding splines of half-shafts that protrude from the case. This design eliminates the need for a spider shaft.

Although the differential of the '983 publication may not suffer from mechanical engagement between the side pinions and a spider shaft (because the differential of the '983 publication does not include a spider shaft), the differential may still be less than optimal. In particular, the moment discussed above that can be created by engagement of the side pinions with the side gears may still exist. This moment may cause the heel end of the side pinions to tilt within the cups, making mechanical engagement between the cylinder wall of the side pinions and the cup side walls possible. In the same manner described above, this engagement may restrict lubrication of the toe end of the pinion gear and result in premature wear.

The disclosed differential is directed to overcoming one or more of the problems set forth above and/or other problems of the prior art.

SUMMARY

In one aspect, the present disclosure is directed to a side pinion for a differential. The side pinion may include a body with a flat bottom and a flat top located at an end opposite the flat bottom. The side pinion may also include a plurality of gear teeth formed adjacent the flat top, and an arcuate outer surface connecting the plurality of gear teeth to the flat bottom.

In another aspect, the present disclosure is directed to a differential. The differential may include an input gear, and a carrier fixedly connected to the input gear. The carrier may be configured to rotate together with the input gear about a primary axis, and may have an internal annular surface with a plurality of cups formed therein that are equally spaced apart around a circumference of the carrier. The differential may also include a first side gear disposed inside the carrier and configured to rotate about the primary axis, a second side gear disposed in the carrier at an end opposite the first side gear and also configured to rotate about the primary axis, and a side pinion disposed within each of the plurality of cups and intermeshed with both of the first and second side gears. The side pinion may have a plurality of gear teeth that protrude from an associated one of the plurality of cups radially inward toward the primary axis, and an arcuate outer surface connected to the plurality of gear teeth at an axial transition region. The arcuate outer surface may conform to an inner contour of the plurality of cups.

In another aspect, the present disclosure is directed to a drivetrain for a mobile machine having first and second traction devices located at opposing sides. The drivetrain may include a power source, a transmission driven by the power source, and a main pinion operatively connected to an output of the transmission. The drivetrain may also include a first half-shaft connected to the first traction device, a second half-shaft connected to the second traction device, and a differential driven by the main pinion to rotate the first and second half-shafts with substantially equal torque. The differential may have an input gear intermeshed with the main pinion, and a carrier fixedly connected to the input gear and configured to rotate together with the input gear about a primary axis. The carrier may have an internal annular surface with a plurality of cups formed therein that are equally spaced apart around a circumference of the carrier. The differential may also have a first side gear disposed inside the carrier and having external teeth at an inner end and an outer end connected to the first half-shaft, a second side gear disposed inside the carrier and having external teeth at an inner end and an outer end connected to the second half-shaft, and a side pinion disposed within each of the plurality of cups and intermeshed with the external teeth of both of the first and second side gears. The side pinion may have a plurality of gear teeth that protrude from an associated one of the plurality of cups radially inward toward the primary axis, and an arcuate outer surface connected to the plurality of gear teeth at an axial transition region and conforming to an inner contour of the plurality of cups. The arcuate outer surface of the side pinion may be formed by rotating a polynomial curve of third order or higher around an axis of the side pinion. When the first and second side gears engage the plurality of gear teeth at opposing sides of the side pinion, a reaction force may be created, and the polynomial curve is selected such that a gradient of the arcuate outer surface at an application point of the reaction force may be about aligned with the reaction force.

BRIEF DESCRIPTION OF THE DRAWINGS

FIG. 1 is an isometric illustration of an exemplary disclosed machine;

FIG. 2 is an isometric illustration of an exemplary disclosed drivetrain that may be used with the machine of FIG. 1;

DETAILED DESCRIPTION

Figure 3:
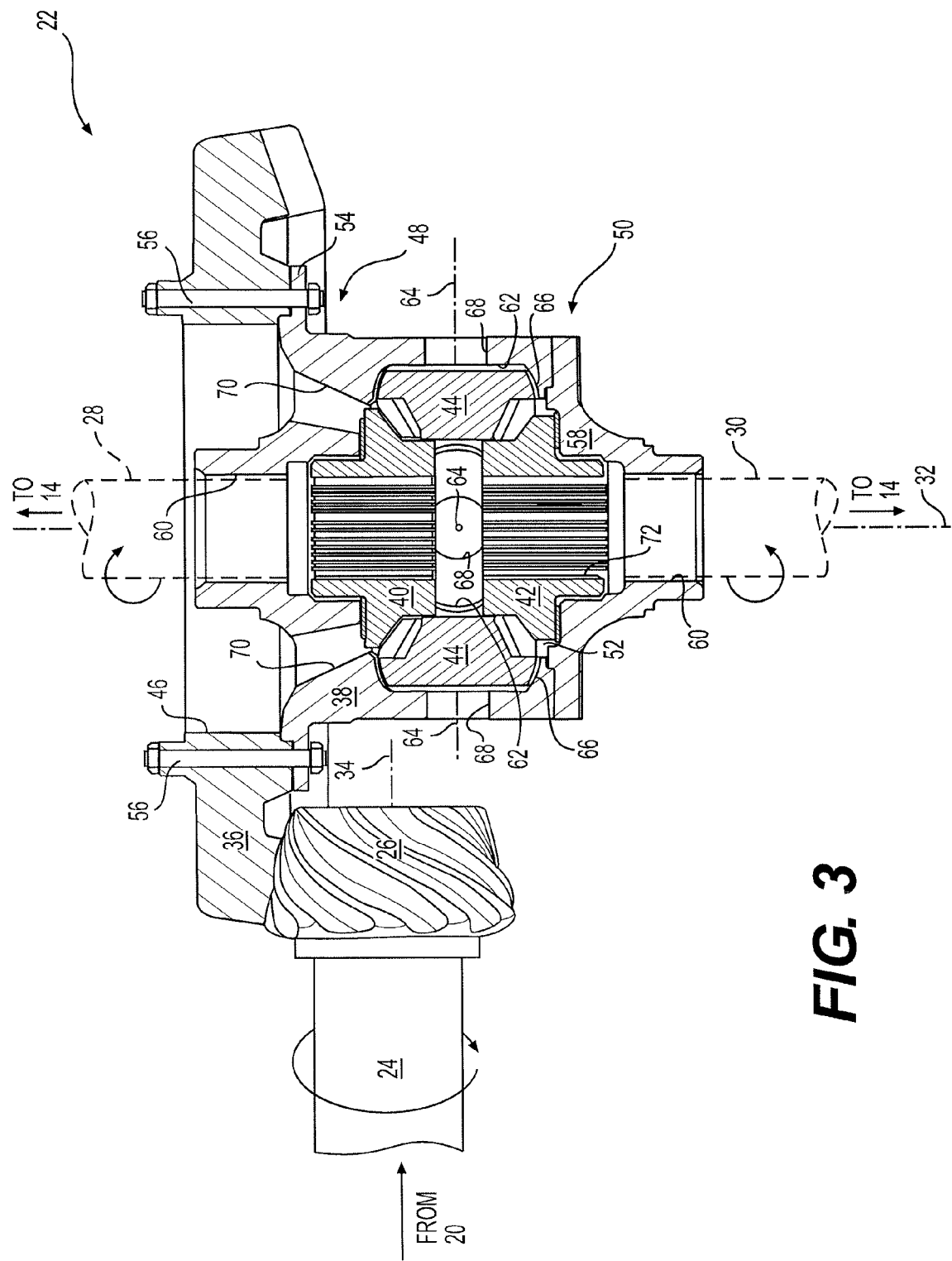
FIG. 3 is a cross-sectional illustration of an exemplary disclosed differential that may be used with the drivetrain of FIG. 2.
Figure 5:
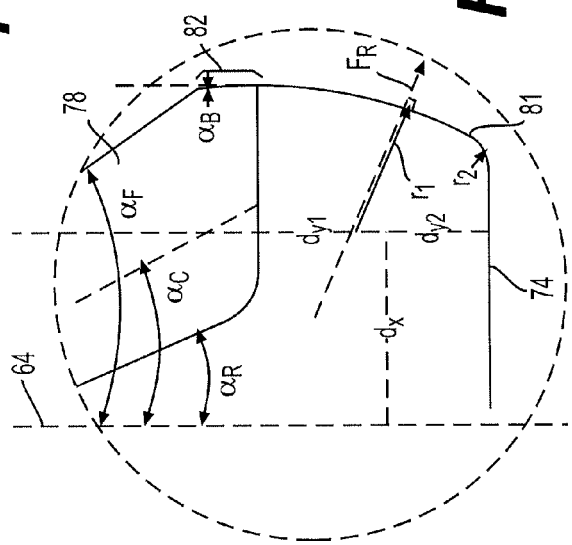
FIGS. 4, 5, 6A, and 6B are plan, isometric view, cross-sectional, and enlarged illustrations, respectively, of an exemplary disclosed side pinion that may form a portion of the differential of FIG. 3.
Figure 6B:
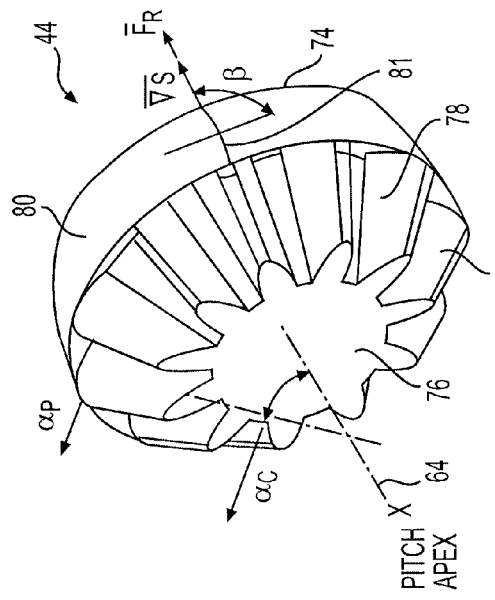
Figure 4:
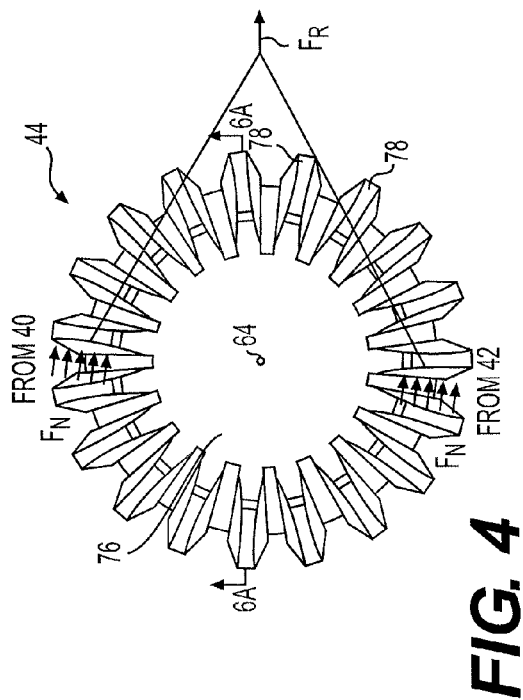
Figure 6A:
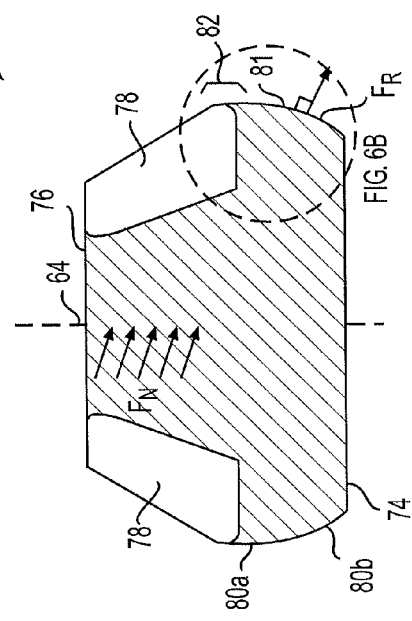

FIG. 1 illustrates an exemplary mobile machine 10. In the depicted embodiment, machine 10 is a wheel loader. It is contemplated, however, that machine 10 may embody another type of mobile machine such as an articulated haul truck, an off-highway mining truck, a motor grader, or another machine known in the art. Machine 10 may include an operator station 12, one or more traction devices 14 located at opposing sides of machine 10 that support operation station 12, and a drivetrain 16 operatively connected to propel traction devices 14 in response to input received via operator station 12.

As shown in FIG. 2, drivetrain 16 may be an assembly of components that transfers power from a power source (e.g. an engine) 18 to traction devices 14. In the disclosed embodiment, these components include a transmission 20 that is operatively connected to and driven by power source 18, one or more differentials 22 operatively connected between pairs of opposing traction devices 14, and one or more output shafts 24 that connect transmission 20 to differentials 22. Transmission 20 may be configured to selectively vary a speed-to-torque ratio of the output from power source 18 that is delivered to differential(s) 22. Each differential 22 may be configured to provide a substantially equal torque to the associated traction devices 14, allowing paired traction devices 14 to rotate at different speeds during turning of machine 10.

FIG. 3 illustrates an exemplary embodiment of differential 22. As can be seen in this figure, differential 22 is configured to receive input from shaft 24 via a main pinion 26, and to direct outputs to traction devices 14 (referring to FIG. 2) via first and second half-shafts 28 and 30. In the disclosed embodiment, differential 22 may have a primary axis 32, along which first and second half-shafts 28, 30 are aligned. Primary axis 32, in this embodiment, is oriented generally orthogonal to an axis 34 of main pinion 26. It is contemplated, however, that in other embodiments, primary axis 32 may be generally parallel with axis 34, if desired.

Main pinion 26 may be any type of gear known in the art that is connectable to an end of shaft 24. Main pinion 26 is depicted in FIG. 3 as a hypoid gear having a frustoconical shape and being welded to an end of shaft 24. Teeth formed within an exterior surface of main pinion 26 have a spiraling trajectory, and axis 34 of main pinion 26 does not pass through primary axis 32 of differential 22. It is contemplated that main pinion 26 could alternatively embody a spiral bevel gear, a straight bevel gear, a single- or double-helical gear, or a spur gear, if desired.

First and second half-shafts 28, 30 may each have an inner end configured to connect with differential 22, and an outer end configured to directly or indirectly connect with the associated traction device 14. In some embodiments, the outer end of first and second half-shafts 28, 30 connect directly with an intermediate speed reducer (e.g., a final drive—not shown), which then connects with traction device 14. Other configurations may also be possible. The inner end of first and second half-shafts 28, 30 are shown as having external splines that facilitate connection to differential 22. In other embodiments, however, first and second half-shafts 28, 30 may additionally or alternatively have bolted flanges, keyways, and/or other means of connection.

Differential 22 may be an assembly of components that cooperate to divide the torque received from main pinion 26 between first and second half-shafts 28, 30. The components may include, among other things, an input gear 36 configured to mesh with main pinion 26; a carrier 38 fixedly connected to rotate with input gear 36 about primary axis 32; first and second side gears 40, 42 connected to first and second half-shafts 28, 30, respectively; and a plurality of side pinions 44 that rotate with carrier 38 about axis 32 and simultaneously intermesh with both of first and second side gears 40, 42. The rotational power received from shaft 24 may pass through main pinion 26 to carrier 38 via input gear 36. Carrier 38 may then transmit the rotational power through side pinions 44 and first and second side gears 40, 42 to first and second half-shafts 28, 30, respectively.

Input gear 36, like main pinion 26, may also be a hypoid gear having teeth that intermesh with the teeth of main pinion 26. As shown in FIG. 3, the teeth of input gear 36 are located at an axial end adjacent carrier 38. In other embodiments, however, the teeth of input gear 36 could alternatively be located at an opposing axial end or on an outer annular edge, if desired. A bore 46 may pass through input gear 36 in order to accommodate first half-shaft 28. It is contemplated that input gear 36 could alternatively embody a spiral bevel gear, a straight bevel gear, a single- or double-helical gear, or a spur gear.

Carrier 38 may be a hollow and cylindrical housing that also functions as a power-transmitting component. In particular, carrier 38 may be have a generally closed end 48 and an opposing end 50 that is open to an internal cavity 52. An integral mounting flange 54 may be located at first end 48, and a plurality of fasteners 56 may be distributed around an outer periphery of carrier 38 to connect mounting flange 54 to input gear 36. First and second side gears 40, 42, along with side pinions 44, may be assembled into cavity 52 via second end 50. A cap 58 may be connected to second end 50 to enclose these components.

Each of first end 48 of carrier 38 and cap 58 may have a bore 60 formed therein that is configured to receive first and second half-shafts 28, 30. In some embodiments, a seal (not shown) may be installed within carrier 38 and/or cap 58 around first and second half-shafts 28, 30 to inhibit debris ingress and lubrication leakage.

A plurality of cups 62 may be formed within an interior annular wall of carrier 38 (i.e., within a wall that annularly surrounds cavity 52). In the disclosed embodiment, carrier 38 includes four cups 62, and each cup 62 is configured to receive a corresponding side pinion 44. It is contemplated that a greater or lesser number of cups 62 could be formed within the interior annular wall of carrier 38, if desired. Cups 62 may be co-located at about the same axial position, and equally distributed around an interior periphery of carrier 38. In embodiments having four cups 62, each cup 62 may be angularly space apart from each other by about 90°. That is, each cup 62 may have a generally circular shape, and an axis 64 of each shape may be orthogonal to the axes 64 of adjacent shapes. In embodiments having a different number of cups 62, the spacing between axes 64 may be less than or more than 90°. For example, when only two cups 62 are included in carrier 38, axes 64 of cups 62 may be angularly spaced apart by about 180°. In the cross-sectional view of FIG. 3, only three cups 62 are shown, and the corresponding side pinion 44 is removed from the center cup 62 for clarity.

Each of cups 62 may have a generally flat bottom surface, and a curved side wall that intersects with the flat bottom surface. In general, the shape of the curved side wall may conform to an external shape of side pinion 44, such that a force directed diagonally through side pinion 44 from side gears 40, 42 may be transmitted in a normal direction to the curved side wall. In this way, a moment may not be created inside side pinion 44 by the force. A clearance gap 66 having a substantially constant thickness of about 0.0254 15 mm/0.001 in may be located between the curved side wall of cup 62 and side pinion 44, and filled with lubrication during operation. An orifice 68 may be formed within the flat bottom surface of each cup and, as will be explained in more detail below, used as a conduit for lubrication. An inner diameter of orifice 68 may be about equal to one-half of an inner diameter of the flat bottom surface of cup 62.

A plurality of additional orifices 70 may be formed in closed end 48 of carrier 38. In one embodiment, the number of additional orifices 70 may match the number of side pinions 44 installed in differential 22. In another embodiment, the number of additional orifices 70 may be some multiple (e.g., 2×) of the number of side pinions 44. Orifices 70 should be generally radially aligned with and/or extend to a mesh location between the teeth of each pinion 44 and first side gear 40 (e.g., aligned at least with an entrant location at which the gear teeth begin to mesh). As will be explained in more detail below, orifices 70 may facilitate lubrication of differential 22.

First and second side gears 40, 42 may be substantially identical bevel gears that are oriented in opposition to each other. External teeth of both gears 40, 42 may be configured to simultaneously intermesh with the teeth of all of side pinions 44 (e.g., at opposite sides of pinions 44) such that, as side pinions 44 are rotated with carrier 38 about axis 32, side gears 40, 42 may also be driven to rotate about the same axis 32. A base end of first side gear 40 may be supported within a corresponding step in carrier 38, while a base end of second side gear 42 may be rotationally supported within a corresponding step in cap 58. Each of first and second side gears 40, 42 may have a splined bore 72 formed therein that is configured to receive a corresponding interior end of first and second half-shafts 28, 30. With this configuration, a rotation of first and second side gears 40, 42 may result in a rotation of first and second half-shafts 28, 30.

Side pinions 44 may be substantially identical bevel gears. As shown in FIGS. 4, 5, 6A, and 6B, each side pinion 44 may have a generally flat bottom 74, a generally flat top 76 located opposite bottom 74, a plurality of gear teeth 78 located adjacent top 76, and an arcuate outer surface ("surface") 80 connecting bottom 74 with teeth 78. Surface 80 may join gear teeth 78 at a transition region 82. An outer diameter at top 76 may be smaller than an outer diameter at bottom 74, and an outer diameter at transition region 82 may be greater than the outer diameter at bottom 74.

Teeth 78 of side pinion 44 may have geometry that is at least partially defined by a plurality of angles. For example, a first angle $\alpha_P$ shown in FIG. 5 may represent a pressure angle of each tooth 78; a second angle $\alpha_F$ shown in FIG. 6B may represent a face angle of teeth 78; a third angle $\alpha_C$ shown in FIGS. 5 and 6B may represent a cone angle of teeth 78; and a fourth angle $\alpha_R$ shown in FIG. 6B may represent a root angle of teeth 78. The pressure angle $\alpha_P$ may be defined as the angle between a primary pressure face of tooth 78 and a tangent to the pitch circle of pinion 44. Each of the remaining angles may be defined by an arc extending between axis 64 and a corresponding line drawn through a Pitch Apex (shown in FIGS. 5 and 6A) of side pinion 44 that lies on axis 64.

As shown in FIGS. 4, 5, 6A, and 6B, when teeth 78 pinion 44 engage the teeth of side gears 40, 42, normal forces $F_N$ (forces at the faces of teeth 78 that are normal to the pressure angle $\alpha_P$) may be generated at opposing sides of pinion 44. These normal forces $F_N$ may combine to produce a resultant force $F_R$. Resultant force $F_R$ may lie in a plane (see FIG. 4) between the opposing sides of pinion 44, and may be inclined relative to bottom 74 and top 76 (see FIGS. 6A and 6B). If the resultant force $F_R$ passes through surface 80 at an oblique angle relative to a gradient at the surface, a moment could be created that causes tilting of pinion 44 when pinion 44 is pushed by the resultant force $F_R$ into cup 62.

The curvature of surface 80 may be designed such that resultant force $F_R$ passes through arcuate outer surface 80 at an angle that is always normal to surface 80. That is, arcuate outer surface 80 may be shaped such that resultant force $F_R$ is oriented about 90° to surface 80 at the application point of resultant force $F_R$. In one embodiment, surface 80 may be at least partially defined by a curve 81 that is rotated about axis 64 of pinion 44. Curve 81 may be, for example, a polynomial curve of higher order (e.g., of $3^{rd}$ order or higher), defined by the following equation:

$$p = \Sigma_{i=0}^{n} a_i x^i \qquad \text{Eq. 1}$$

wherein:
 p represents curve 81;
 n represents the order of the curve;
 a is a coefficient; and
 x is distance along axis 64.

The angular orientation of resultant force $F_R$ in space may be defined by an angle $\beta$ (shown in FIG. 5) and controlled by the pressure angle $\alpha_P$ and the cone angle $\alpha_C$ according to the following equation:

$$\tan \beta = \tan \alpha_P \cdot \sin \alpha_C \qquad \text{Eq. 2}$$

wherein:
 $\beta$ is the angular orientation of resultant force $F_R$ in space;
 $\alpha_P$ represents the pressure angle; and
 $\alpha_C$ represents the pitch or cone angle.

Using Eq. 1 and Eq. 2 from above, curve 81 may be derived by requiring that the cross product between a gradient ($\nabla S$) of surface 80 and the resultant force $F_R$ equals zero (i.e., that $\nabla S \times F_R = 0$), at the application point of the resultant force $F_R$.

It is contemplated that, in some applications, surface 80 may be divided into multiple sections that are axially adjacent each other. For example, surface 80 could be divided into a first section 80a (see FIG. 6A) located adjacent teeth 78, and a second section 80b located between first section 80a and bottom 74. In this example, section 80b may be larger than section 80a (e.g., 2-3 times larger). It should be noted that surface 80 could be divided into more than two sections and/or that the sections could have different relative sizes, if desired. Each of the sections of surface 80 may have unique curvature defined by a different polynomial (e.g., a different order polynomial) and be designed to perform differently under different circumstances. For example, section 80a may have a lower order polynomial than section 80b, as section 80a may experience less loading the section 80b. In general, a higher-power/lower-speed application may utilize surface 80 created using more sections and higher-order polynomials (e.g., 5-$6^{th}$ order), while a lower-power/higher-speed application may use fewer sections (e.g., only one section) and lower-order polynomials (e.g., 3-$4^{th}$ order). For the purpose of this application, a higher-power/lower-speed application may be considered an application transmitting about 447.4 kW/600 horsepower or more at speeds less than about 100 rpm.

In one specific exemplary embodiment of pinion 44, the pressure angle $\alpha_P$ may be about 14-25°; the face angle $\alpha_F$ may be about 35-37°; the cone angle $\alpha_C$ may be about 28-38°; and the root angle $\alpha_R$ may be about 23-25°. It is contemplated that these angles may have different values for different applications. For the purposes of this disclosure, the term "about", when used in reference to a dimensional value, may be defined as being within an acceptable range of manufacturing tolerances.

In the specific exemplary embodiment provided above, a radius $r_1$ may be used to at least partially define the curvature of surface 80 and may have its origin positioned along the trajectory of resultant force $F_R$. For example, the origin of radius $r_1$ may be positioned at coordinates $(dx, dy_1)$, which may be included in the vector of resultant force $F_R$, and located in the same plane as $F_R$. In the disclosed embodiment, $r_1$ may be about 40-45 mm/1.575-1.771 in, while $(dx, dy_1)$ may be about equal to (15-20 mm/.591-.787 in, 90-95 mm/3.543-3.740 in) when measured from axis 64 and the Pitch Apex of pinion 44, respectively. In this configuration, the origin of $r_1$ may be located a distance $dy_2$ from bottom 74 that is about 20-25 mm/.787-.984 in.

Axial ends of arcuate outer surface 80 may be designed to inhibit stress riser formation. For example, a lower edge connecting flat bottom 74 with arcuate outer surface 80 may be rounded, and have a radius $r_2$ of about 1-3 mm/.039-.118 in. Likewise, transition region 82 that connects surface 80 with teeth 78 may taper inward to have a back angle $\alpha_B$ of about 2-4°.

Figure 7:
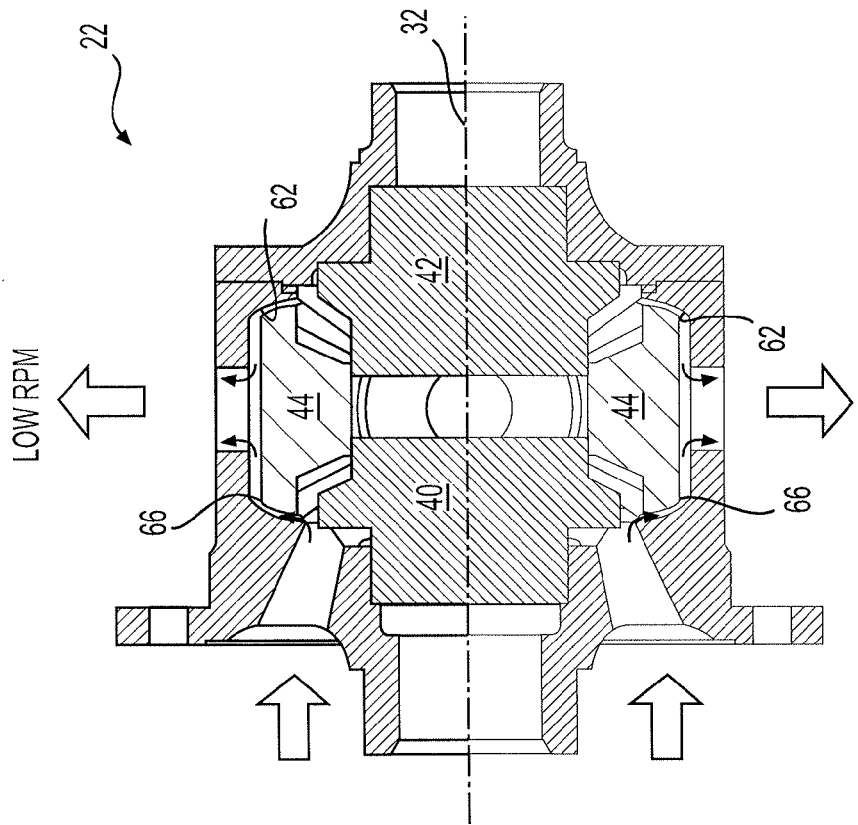
FIGS. 7 and 8 are cross-sectional illustrations of exemplary lubrication flows through the differential of FIG. 3.
Figure 8:
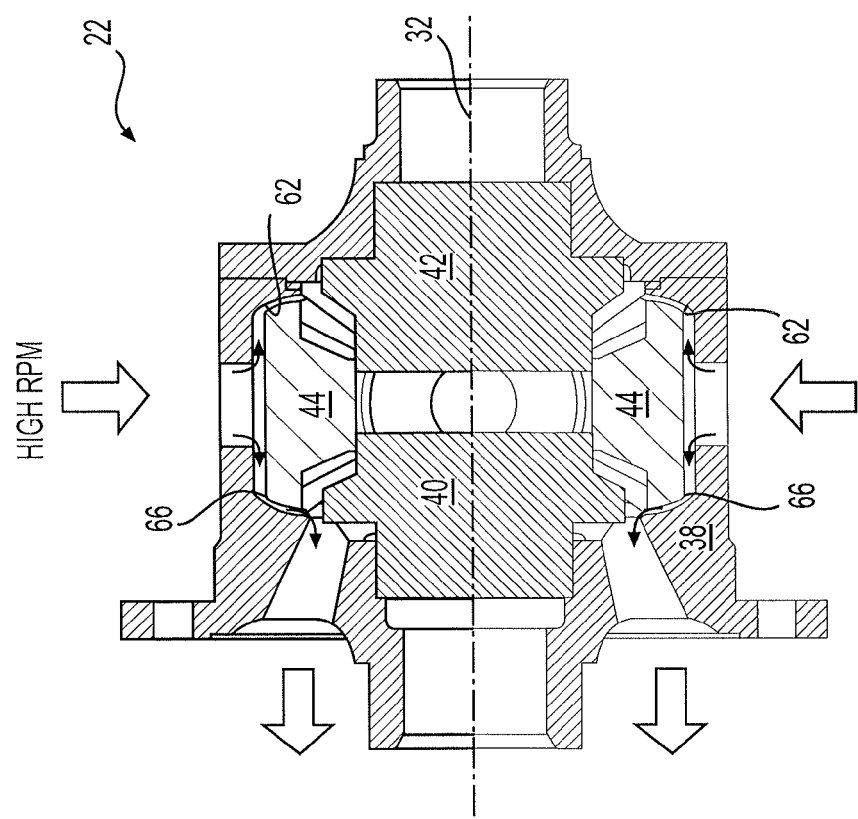

FIGS. 7 and 8 illustrate lubrication flows through differential 22 during two different situations. Specifically, FIG. 7 illustrates lubrication flow during high-speed travel of machine 10, while FIG. 8 illustrates lubrication flow during low-speed travel. During any operation of machine 10, differential 22 may be filled about halfway up with lubrication. Specifically, the lubrication may fill a lower half of an axle housing (not shown) in which differential 22 is located, and the lubrication may reach up to about axis 32 of carrier 38.

As shown in FIG. 7, during high-speed travel, when carrier 38 is driven to rotate at high rpms, the external surface of carrier 38 may continuously drag through the volume of lubrication inside the axle housing. During this rotation, orifices 68 may fill with oil, and a layer of oil may cling to the outside surface of carrier 38. The high-speed rotation of carrier 38 may result in high-speed rotations of side pinions 44 and corresponding high-speed rotations of side gears 40, 42. As the teeth of these gears mesh with each other, they may function as pumps, drawing the lubrication from orifices 68 radially inward at separation of the teeth and pushing the lubrication axially outward at engagement of the teeth. The lubrication may be discharged axially outward through orifices 70. By this action, a lubrication film may be created between side pinions 44 and cups 62 (i.e., within gaps 66), and also between the teeth of the intermeshing gears.

When the travel of machine 10 transitions from high-speed travel to low-speed travel, the direction of lubrication flow through differential 22 may reverse. Specifically, when carrier 38 is driven to rotate at low rpms, the teeth of input gear 36 may function as radially oriented fluid screws (e.g., because of their pitch and helical angle). That is, the teeth of input gear 36 may be filled as they are dunked into the volume of lubrication in the axle housing, and the pitch angle of the teeth, combined with the rotational motion of input gear 36, may overcome any centrifugal forces acting on the lubrication and push the lubrication radially inward toward orifices 70. The lubrication may be pushed through the intermeshing engagement of side pinions 44 with side gears 40, 42, and then be flung radially outward via through orifices 68. In this situation, the centrifugal forces flinging the lubrication radially outward through orifices 68 may be greater than the pumping forces of the intermeshing teeth that would otherwise draw the lubrication radially inward.

For the purposes of this disclosure, high-speed travel may be considered travel at speeds within an upper two-thirds of an overall speed range.

Figure 10:
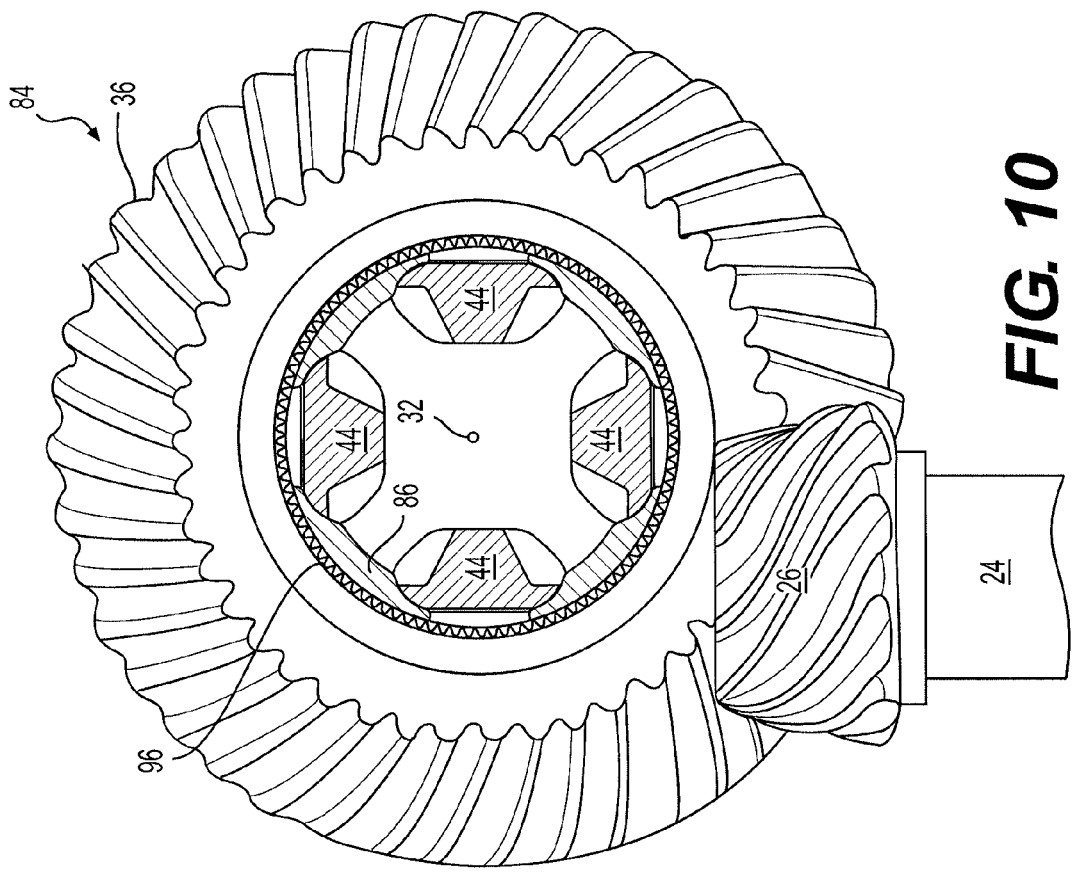
FIGS. 9 and 10 are cross-sectional side and end view illustrations, respectively, of another exemplary disclosed differential that may be used with the drivetrain of FIG. 2.
Figure 9:
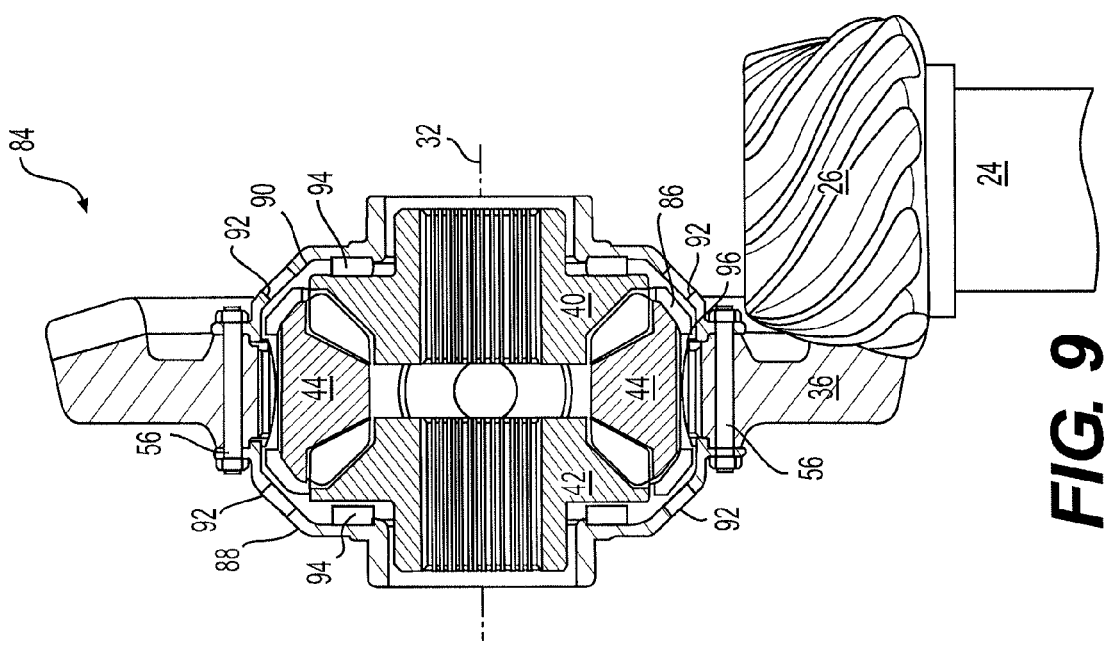

FIGS. 9 and 10 illustrate an alternative differential embodiment, labeled as element 84. Like differential 22 of FIGS. 1-8, differential 84 of FIG. 9 may include input gear 36, first side gear 40, second side gear 42, and side pinions 44. However, in contrast to differential 22, differential 84 may not include carrier 38. Instead, a nested carrier 86 may be used to transfer torque from input gear 36 to side pinions 44. In this embodiment, nested carrier 86 may function primarily as a power-transmitting component, and additional housing members 88, 90 may be used to enclose the other components of differential 84. Housing members 88, 90 may be substantially identical to each other (e.g., within manufacturing tolerances), and bolted to opposing sides of input gear 36 via fasteners 56. A plurality of orifices 92 may be formed in housing members 88, 90 to function as conduits for lubrication. Because housing members 88, 90 may not be power-transmitting components, housing members 88, 90 may be thinner-walled and lighter weight, when compared to carrier 38.

As shown in FIG. 9, differential 84 may be relatively compact. In particular, because carrier 86 may be nested radially inside of input gear 36 (i.e., instead of being bolted at an axial end), the overall axial length of differential 84 may be less. In this configuration, first side gear 40 may be located at a first axial end of input gear 36, while second side gear 42 may be located at a second axial end of input gear 36 opposite the first axial end. In other words, first and second side gears 40, 42 may be located at opposing sides of input gear 36, rather than both being located at the same side. This may afford greater flexibility in packaging of drivetrain 16 (referring to FIG. 2). One or more spacers 94 may be included to axially position nested carrier 86 inside of input gear 36. Each of spacers 94 may be generally ring-like, and positioned between a corresponding one of housing members 88, 90 and an end of a corresponding one of side gears 40, 42.

For the sake of clarity, housing members 88 and 90, spacers 94, and side gears 40 and 42 have been removed from FIG. 10. As seen in this figure, carrier 86 may be connected to input gear 36 by way of a splined interface 96. This type of interface may allow carrier 86 (as well as the other components carried by carrier 86) to float axially somewhat within input gear 36 during assembly and operation of differential 84. This axial floating ability may account for manufacturing inconsistencies that could otherwise cause binding between carrier 86 and input gear 36.

Figure 12:
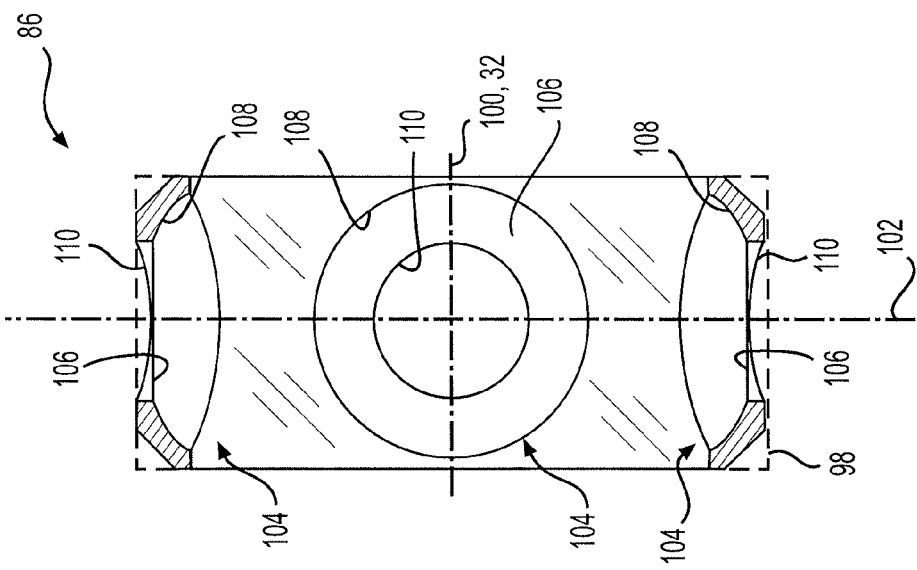
FIGS. 11 and 12 are isometric and cross-sectional side view illustrations, respectively, of an exemplary disclosed nested carrier that may be used with the differential of FIGS. 8 and 9.
Figure 11:
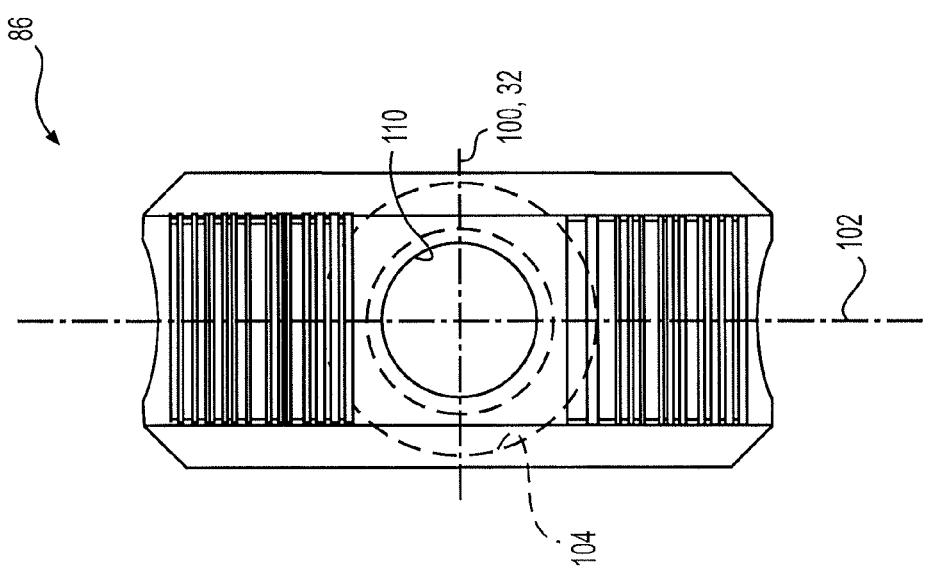

FIG. 11 illustrates an external side view of nested carrier 86, while FIG. 12 illustrates a cross-sectional side view of nested carrier 86 taken along a first axially oriented plane of symmetry 98. As shown in these figures, nested carrier 86 may be generally cylindrical and hollow, having a two opposing open ends. In addition to being generally symmetrical relative to plane 98, nested carrier 86 may also be generally symmetrical relative to a second axially oriented plane 100 and relative to a radially oriented plane 102. Nested carrier 86 may have formed therein a plurality of cups 104 (e.g., four cups 104) that are identical to cups 62 described above in regard to differential 22. Specifically, each of cups 104 may include a flat bottom surface 106, and a curved side wall 108 that intersects with bottom surface 106. In general, the shape of curved side wall 108 may conform to an external shape of side pinion 44, such that the reaction force $F_R$ directed diagonally through side pinion 44 from side gears 40, 42 may be transmitted in a normal direction to curved side wall 108. An orifice 110 may be formed within bottom surface 106 of each cup 104 and, in a manner similar to what is explained above with respect to FIGS. 7 and 8, used for lubrication purposes. Outer edges of nested carrier 86 may be rounded or beveled, as desired, to facilitate assembly into input gear 36.

Figures 13, 14:
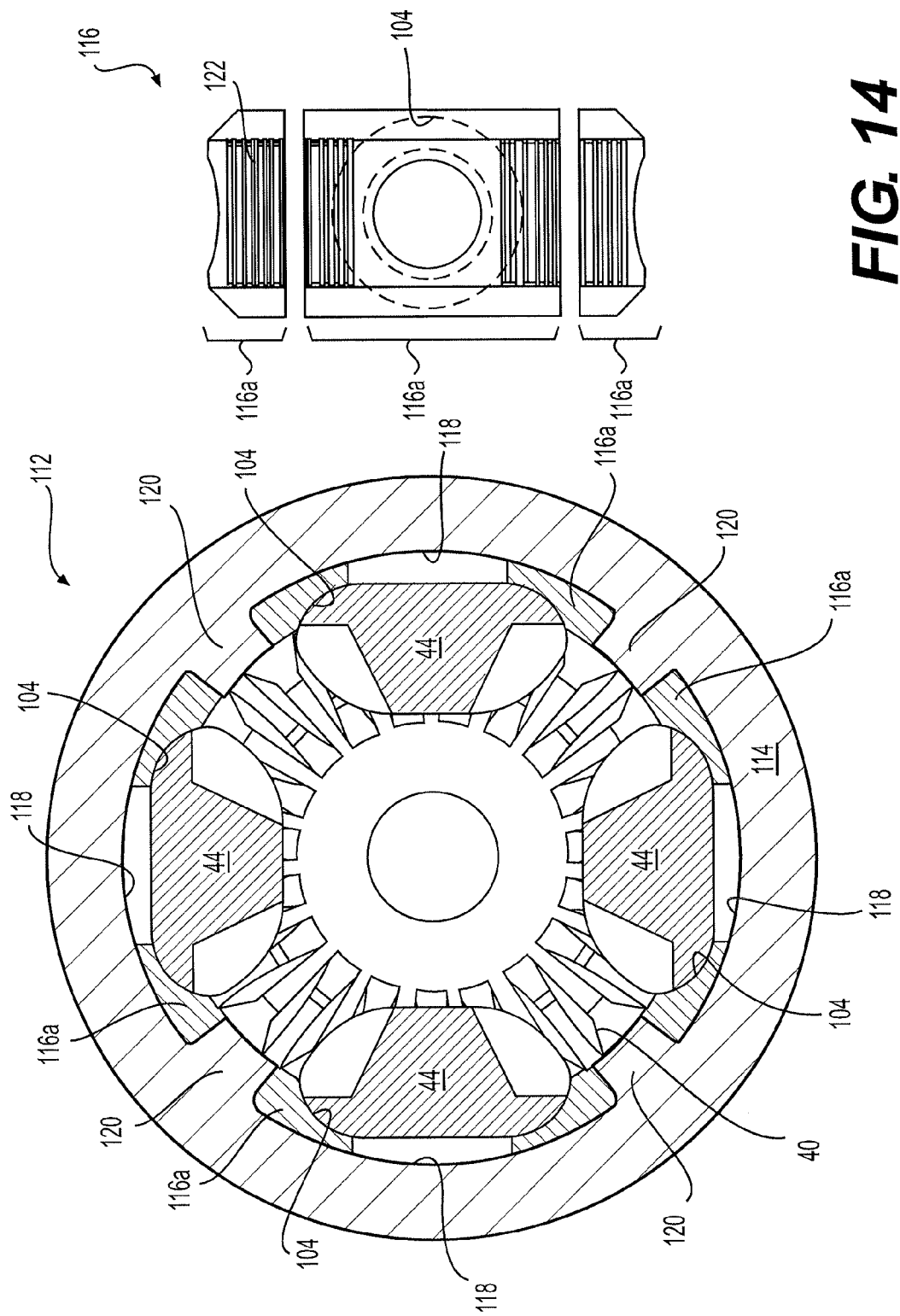
FIG. 13 is a cross-sectional illustration of another exemplary disclosed differential that may be used with the drivetrain of FIG. 2.
FIG. 14 is an isometric side view illustration of another exemplary disclosed nested carrier that may be used with the differential of FIG. 13.

FIG. 13 illustrates another alternative differential embodiment, labeled as element 112. Like differential 84 of FIGS. 9 and 10, differential 112 of FIG. 13 may include first side gear 40, second side gear 42 (omitted from FIG. 13 for the sake of clarity), and side pinions 44. However, in contrast to differential 84, differential 112 may include a different input gear 114, and a different nested carrier 116 used to transfer rotation from input gear 114 to side pinions 44. Nested carrier 116, unlike nested carrier 86, may not form a complete cylinder. Instead, nested carrier 116 may be formed from two or more (e.g., from four) substantially identical carrier members 116a that are annularly spaced apart from each other. Each carrier member 116a may located inside a pocket 118 formed within an interior of input gear 114, and a spacer 120 may protrude radially inward to annularly separate adjacent carrier members 116a. In the disclosed embodiment, spacer 120 may be integral to input gear 114. In other embodiments, however, spacers 120 may be separate standalone component.

As shown in FIG. 14, each carrier member 116a may include external splines 122 configured to engage corresponding splines within pockets 118 (referring to FIG. 13) of input gear 114, and a single cup 104. Each carrier member 116a may be able to float axially somewhat relative to input gear 114, yet still be connected to input gear 114 via splines 122 to receive an input torque. By forming nested carrier 116 via multiple separate members 116a, the likelihood of misalignment or manufacturing inconsistencies causing binding of nested carrier 116 may be reduced even further. It is contemplated that splines 122 could be omitted, if desired, and spacers 120 alternatively utilized for the torque transfer.

Figure 15:
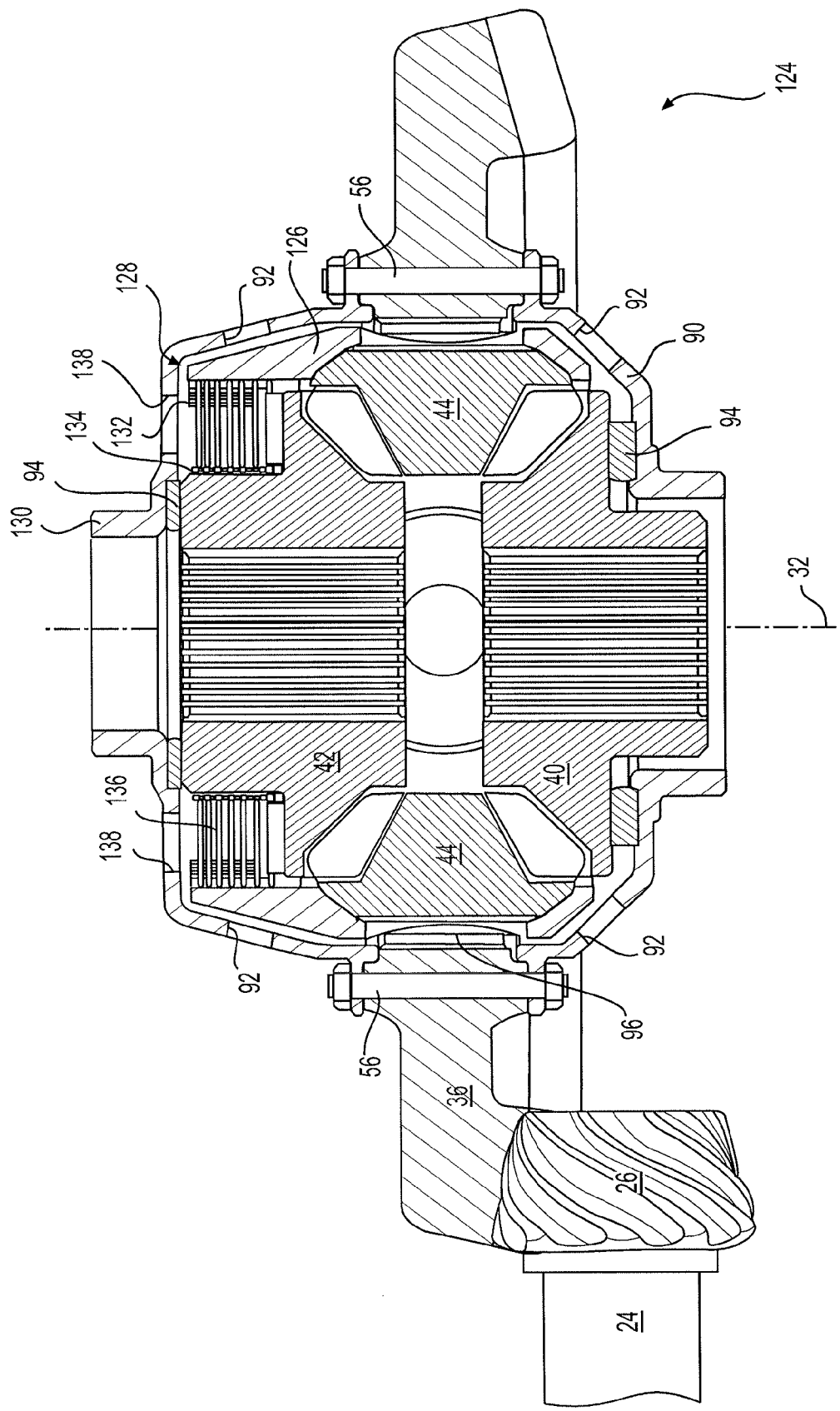
FIG. 15 is a cross-sectional illustration of another exemplary disclosed differential that may be used with the drivetrain of FIG. 2.

FIG. 15 illustrates another alternative differential embodiment, labeled as element 124. Like differential 84 of FIGS. 9 and 10, differential 124 of FIG. 15 may include input gear 36, first side gear 40, second side gear 42, side pinions 44, and housing member 90. However, in contrast to differential 84, differential 124 may include a different nested carrier 126 used to transfer rotation from input gear 36 to side pinions 44, a lockup clutch 128 configured to selectively lock rotation of side gear 42 to side gear 40 via nested carrier 126, and a larger (e.g., axially longer) housing member 130 used to enclose nested carrier 126 and lockup clutch 128.

Nested carrier 126, unlike nested carrier 86, may not be axially symmetric. In particular, nested carrier 126 may extend axially a distance in one direction past pinion gears 44 toward a base end of side gear 42. One or more internal gear teeth (e.g., splines) 132 may be formed at an inner annular surface of the protruding portion of nested carrier 126. As will be explained in more detail below, teeth 132 may be used to selectively connect nested carrier 126 to second side gear 42 via lockup clutch 128.

Lockup clutch 128 may itself be a sub-assembly of multiple components arranged to rotate around axis 32. For example, lockup clutch 128 may include a disk stack 136, and a hydraulic actuator (not shown) that is configured to selectively compress disk stack 136. Disc stack 136 may include a plurality of friction disks, a plurality of separator disks interleaved with the friction disks and, in some instances, a damper (not shown) located at one or both ends of disc stack 136. The friction disks may be connected to rotate with one of nested carrier 126 (e.g., via teeth 132) and second side gear 42 (e.g., by way of corresponding external teeth 134), while the separator disks may be connected to rotate with the other of nested carrier 126 and second side gear 42. In this manner, when the hydraulic actuator is activated, the friction disks may be sandwiched between the separator disks, thereby creating friction that inhibits relative rotation between nested carrier 126 and second side gear 42. When the rotation of second side gear 42 is constrained to the rotation of nested carrier 126, second side gear 42 may rotate at the same speed as first side gear 40, regardless of machine turning or ground conditions. This may help to improve traction during poor ground conditions. A fluid pressure within the hydraulic actuator may relate to a magnitude of the friction resisting relative rotation, and be provide via one or more axial ports 138.

The hydraulic actuator may embody a service piston that works to compress disk stack 136 under different conditions. The service piston may be ring-like and, together with housing member 130, form a control chamber. When the control chamber is filled with pressurized oil via port 138, the hydraulic actuator may be urged toward disk stack 136, thereby compressing disc stack 136.

In some embodiments, one or more springs (not shown) may be arranged in various configurations to bias the hydraulic actuator away from disc stack 136. In these configurations, when pressurized fluid is not supplied into the control chamber, the hydraulic actuator may be deactivated by the springs and moved away from disc stack 136 to reduce the friction generated between the disks and plates thereof.

Housing member 130, together with housing member 90, may substantially enclose the other rotating components of differential 124. As in the differential embodiment of FIGS. 9 and 10, housing members 90, 130 associated with differential 124 may be used primarily to house the other components and not to transfer torque. For this reason, housing members 90, 130 may be relatively thin-walled and lightweight. Like housing member 88, housing member 130 may additionally function to axially position second side gear 42 by way of spacer 94.

INDUSTRIAL APPLICABILITY

The disclosed differentials and side pinions of the present disclosure have potential application in any machine requiring torque delivery to paired traction devices. The disclosed differentials and side pinions may have extended life and improved efficiency. The extended life may be provided by reducing, or even eliminating, moments within the side pinions that tend to cock the side pinions away from desired positions. The moments may be eliminated by way of a unique outer curvature of the side pinions. The unique outer curvature of the side pinions may help to ensure that the loading forces are directed normally into corresponding cups formed in the differentials. By maintaining the side pinions in their desired positions, lubrication flow to the rotating components of the disclosed differentials may be ensured, which may prolong a life of these components and also reduce friction of the rotations. Reduced friction may improve the efficiency of the disclosed differentials.

In addition, because the disclosed side pinions may not need spider shafts to support their rotations, the size, the weight, and the cost of the disclosed differentials may be lower. Further, without spider shafts, it may be easier to avoid moment creation and/or to distribute the loading forces over a greater area. This increased force distribution may reduce a likelihood of metallic contact between components, which may further reduce wear of the disclosed differentials. Finally, because the disclosed side pinions may not have central bores normally required to accommodate spider shafts, all lubrication directed into the disclosed differentials at the side pinions may be used to maintain an oil film between the side pinions and the associated cups. This load-bearing layer of oil may further reduce the likelihood of metal-on-metal contact, which may prolong the life of the disclosed differentials.

Finally, the disclosed differentials may have greater packaging flexibility. Specifically, the axially compact design of some of the disclosed differentials, may provide more space for other drivetrain component.

It will be apparent to those skilled in the art that various modifications and variations can be made to the differentials and side pinions of the present disclosure without departing from the scope of the disclosure. Other embodiments will be apparent to those skilled in the art from consideration of the specification and practice of the differentials and side pinions disclosed herein. It is intended that the specification and examples be considered as exemplary only, with a true scope of the disclosure being indicated by the following claims and their equivalents.

What is claimed is:

1. A side pinion for a differential, comprising:
    a body having a flat bottom and a flat top located at an end opposite the flat bottom;
    a plurality of gear teeth formed adjacent the flat top; and
    an arcuate outer surface connecting the plurality of gear teeth to the flat bottom;
    wherein the arcuate outer surface is formed by rotating a polynomial curve of third order or higher around an axis of the side pinion.

2. The side pinion of claim 1, wherein:
    the differential has side gears that are configured to engage the plurality of gear teeth at opposing sides of the side pinion;
    when the side gears engage the plurality of gear teeth at the opposing sides of the side pinion, a reaction force is created; and
    the polynomial curve is selected such that a gradient of the arcuate outer surface at an application point of the reaction force is about aligned with the reaction force.

3. The side pinion of claim 2, wherein:
    a pressure angle of the plurality of gear teeth is about 14-25°;
    a root angle of the plurality of gear teeth is about 23-25°; and
    a cone angle of the side pinion is about 28-38°.

4. The side pinion of claim 3, wherein a radius of the arcuate outer surface at an application point of the reaction force is about 40-45 mm.

5. The side pinion of claim 4, wherein an edge radius at a transition of the arcuate outer surface and the flat bottom is about 1-3 mm.

6. The side pinion of claim 5, wherein:
    the arcuate outer surface joins the plurality of gear teeth at a transition region; and
    the transition region tapers inward away from the arcuate outer surface at a back angle of about 2-4°.

7. The side pinion of claim 1, wherein the arcuate outer surface comprises multiple sections that are located axially adjacent to each other and that are each defined by a different polynomial curve.

8. The side pinion of claim 7, wherein a first section of the arcuate outer surface adjacent the plurality of gear teeth is defined by a polynomial curve having a lower order than a second section of the arcuate outer surface located between the first section and the bottom.

9. The side pinion of claim 1, wherein:
the differential is designed for use in-high-power applications of 447.4 kW/600 horsepower or higher; and
the arcuate outer surface comprises multiple sections formed by a $5^{th}$ or $6^{th}$ order polynomial curve.

10. The side pinion of claim 1, wherein:
the differential is designed for use in-low-power applications of 447.4 kW/600 horsepower or less; and
the arcuate outer surface comprises a single section formed by a $3^{rd}$ or $4^{th}$ order polynomial curve.

11. The side pinion of claim 1, wherein an outer diameter at the flat top is smaller than an outer diameter at the flat bottom.

12. The side pinion of claim 11, wherein an outer diameter at an axial transition region between the plurality of gear teeth and the arcuate outer surface is larger than the outer diameter at the flat bottom.

13. A differential, comprising:
an input gear;
a carrier fixedly connected to the input gear and configured to rotate together with the input gear about a primary axis, the carrier having an internal annular surface with a plurality of cups formed therein and equally spaced apart around a circumference of the carrier;
a first side gear disposed inside the carrier and configured to rotate about the primary axis;
a second side gear disposed in the carrier at an end opposite the first side gear and also configured to rotate about the primary axis;
a side pinion having a body having a flat bottom and a flat top located at an end opposite the flat bottom, the side pinion disposed within each of the plurality of cups and intermeshed with both of the first and second side gears, the side pinion having a plurality of gear teeth that protrude from an associated one of the plurality of cups radially inward toward the primary axis, and an arcuate outer surface connected to the plurality of gear teeth at an axial transition region and conforming to an inner contour of the plurality of cups;
wherein the arcuate outer surface is formed by rotating a polynomial curve of third order or higher around an axis of the side pinion.

14. The differential of claim 13, wherein:
when the first and second side gears engage the plurality of gear teeth at opposing sides of the side pinion, a reaction force is created; and
the polynomial curve is selected such that a gradient of the arcuate outer surface at an application point of the reaction force is about aligned with the reaction force.

15. The differential of claim 13, wherein the arcuate outer surface of the side pinion comprises multiple sections that are located axially adjacent to each other and that are each defined by a different polynomial curve.

16. The differential of claim 15, wherein a first section of the arcuate outer surface adjacent the plurality of gear teeth is defined by a polynomial curve having a lower order than a second section of the arcuate outer surface located between the first section and the bottom.

17. The differential of claim 13, wherein:
an outer diameter at the flat top is smaller than an outer diameter at the flat bottom; and
an outer diameter at the axial transition region is larger than the outer diameter at the flat bottom.

18. A drivetrain for a mobile machine having first and second traction devices located at opposing sides, the drivetrain comprising:
a power source;
a transmission driven by the power source;
a main pinion operatively connected to an output of the transmission;
a first half-shaft connected to the first traction device;
a second half-shaft connected to the second traction device; and
a differential driven by the main pinion to rotate the first and second half-shafts with substantially equal torque, the differential including:
an input gear intermeshed with the main pinion;
a carrier fixedly connected to the input gear and configured to rotate together with the input gear about a primary axis, the carrier having an internal annular surface with a plurality of cups formed therein and equally spaced apart around a circumference of the carrier;
a first side gear disposed inside the carrier and having external teeth at an inner end and an outer end connected to the first half-shaft;
a second side gear disposed inside the carrier and having external teeth at an inner end and an outer end connected to the second half-shaft; and
a side pinion disposed within each of the plurality of cups and intermeshed with the external teeth of both of the first and second side gears, the side pinion having a plurality of gear teeth that protrude from an associated one of the plurality of cups radially inward toward the primary axis, and an arcuate outer surface connected to the plurality of gear teeth at an axial transition region and conforming to an inner contour of the plurality of cups,
wherein:
the arcuate outer surface of the side pinion is formed by rotating a polynomial curve of third order or higher around an axis of the side pinion;
when the first and second side gears engage the plurality of gear teeth at opposing sides of the side pinion, a reaction force is created; and
the polynomial curve is selected such that a gradient of the arcuate outer surface at an application point of the reaction force is about aligned with the reaction force.

* * * * *